United States Patent [19]

King

[11] 3,753,835

[45] Aug. 21, 1973

[54] SPLICING TAPE DISPENSER-APPLICATOR

[75] Inventor: James L. King, Sudbury, Mass.

[73] Assignee: King Instrument Corporation, Waltham, Mass.

[22] Filed: June 21, 1971

[21] Appl. No.: 155,023

[52] U.S. Cl. .................... 156/506, 156/518, 83/167, 83/229

[51] Int. Cl. .................... B31f 5/00, B26d 5/20

[58] Field of Search .................... 156/505, 506, 519, 156/520, 521; 83/167, 222, 229

[56] References Cited

UNITED STATES PATENTS

| | | | |
|---|---|---|---|
| 1,127,843 | 2/1915 | Allen | 156/519 |
| 2,144,917 | 1/1939 | Erickson | 156/521 |
| 3,634,171 | 1/1972 | Rosborough | 156/506 |
| 3,664,903 | 5/1972 | McCorkle | 156/506 |

*Primary Examiner*—Douglas J. Drummond
*Attorney*—Robert J. Schiller et al.

[57] ABSTRACT

The invention is a mechanism for dispensing and applying adhesive-coated splicing tape. The mechanism is particularly useful in a machine for splicing magnetic tapes and winding magnetic tapes into cassettes. The invention comprises a carriage that supports a supply spool for splicing tape, feeding means for pulling splicing tape off of the supply spool and advancing it along a predetermined path, means for reciprocating the carriage vertically toward and away from a splicing station, means for indexing the feeding means so as to advance a selected amount of tape when the carriage is moving away from the splicing station, and means for severing a piece from the leading end of the splicing tape and pressing it against tapes to be spliced located at the splicing station.

17 Claims, 10 Drawing Figures

INVENTOR.
JAMES L. KING
BY
Schiller & Pandiscio
ATTORNEYS

INVENTOR.
JAMES L. KING
BY
Schiller & Pandiscio
ATTORNEYS

INVENTOR.
JAMES L. KING
BY Schiller & Pandiscio
ATTORNEYS

INVENTOR.
JAMES L. KING
BY
Schiller & Pandiscio
ATTORNEYS

INVENTOR.
JAMES L. KING
BY
Schiller & Pandiscio
ATTORNEYS

INVENTOR.
JAMES L. KING
BY
Schiller & Pandiscio
ATTORNEYS

SPLICING TAPE DISPENSER-APPLICATOR

This invention relates to tape splicing apparatus.

The primary object of this invention is to provide a new and improved apparatus for dispensing and applying splicing tape.

Another object of this invention is to provide a new and improved tape splicing mechanism for use in machines for splicing and winding tapes into cassettes.

A more specific object is to provide a machanism for feeding, severing, and applying splicing tape.

Another specific object is to provide a splicing tape dispensing mechanism which is compact, fast-acting, reliable in operation, and can be made at relatively low cost.

The apparatus of the present invention has utility where it is desired to splice two elongated webs, e.g. magnetic tape, by means of an adhesive-coated splicing tape, and is described hereinafter as it would be used in a machine for splicing and winding magnetic tape into a tape cassette.

Magnetic tape cassettes, e.g. of the type shown in U.S. Pat Nos. 3423038 and 3167267, are customarily available commercially with blank (i.e., unrecorded) magnetic tape or with prerecorded magnetic tape. The typical magnetic cassette consists of a cassette case containing two rotatable spools or hubs, a leader attached to each spool or hub, and a predetermined length of magnetic tape having its ends spliced to the two leaders. In the manufacture of such cassettes, the common practice is to start with an empty cassette consisting of the cassette case with the two hubs and a single length of leader tape having one end connected to one hub and the other end connected to the second hub. The first step in filling the cassette with blank or prerecorded tape is to cut the leader tape to form two discrete leaders. Then the magnetic tape to be wound into the cassette is spliced to one leader and the hub to which the one leader is connected is rotated to wind up a given length of magnetic tape. Thereafter the magnetic tape is cut and the trailing end of the given length of magnetic tape is spliced to the leader attached to the other hub. An alternative procedure is to start with only the two hubs each having a short leader, splice magnetic tape to the leader on one hub, wind a given amount of tape on that one hub, splice the trailing end of the magnetic tape to the leader on the other hub, and thereafter mount the two hubs in a cassette case. Accordingly a furthermore specific object of the invention is to provide a splicing tape dispensing and applicating mechanism which may be used to splice magnetic tape to leaders of cassette hubs according to the foregoing alternative modes of cassette manufacture.

The foregoing objects and other objects which are obvious to persons skilled in the art from the following specification are achieved by a splicing tape dispensing and applicating mechanism which comprises a carriage adapted to support a roll of adhesive-backed splicing tape and means for moving the carriage into and out of splicing position. The carriage includes means operated by movement of the carriage for feeding tape from the supply roll, and means for serving a short section of said splicing tape and applying the severed section of splicing tape to the adjacent ends of two tapes, e.g. a leader tape and a magnetic tape, whereby the two tapes are spliced together.

Other features and many of the attendant advantages of the invention are set forth in or rendered obvious by the following detailed specification which is to be considered with the accompanying drawings wherein.

Figure 1:
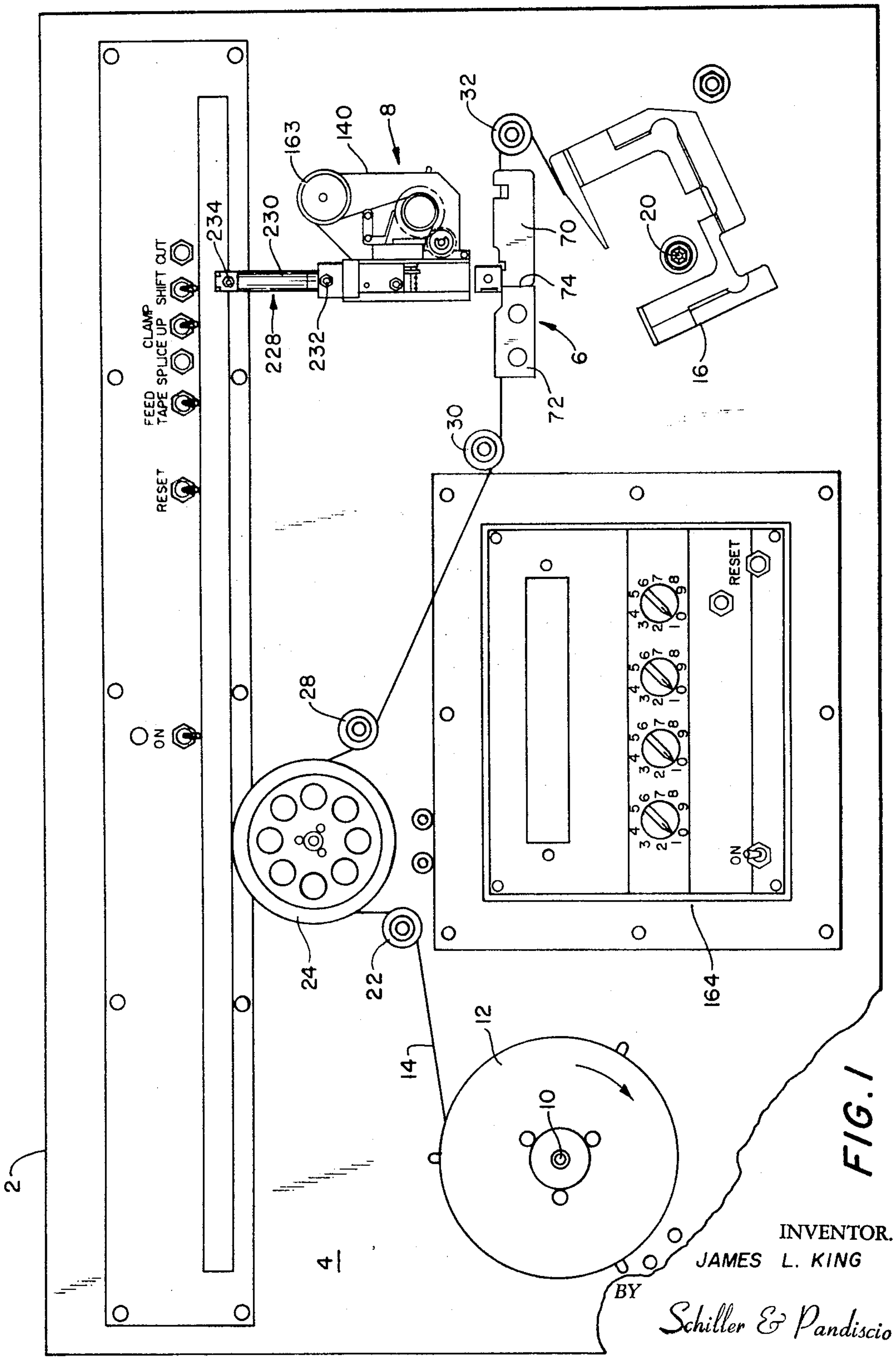
FIG. 1 is a front elevation of a cassette tape winding and splicing machine embodying a splicing tape dispensing and applicating mechanism constructed in accordance with this invention.
Figure 2:
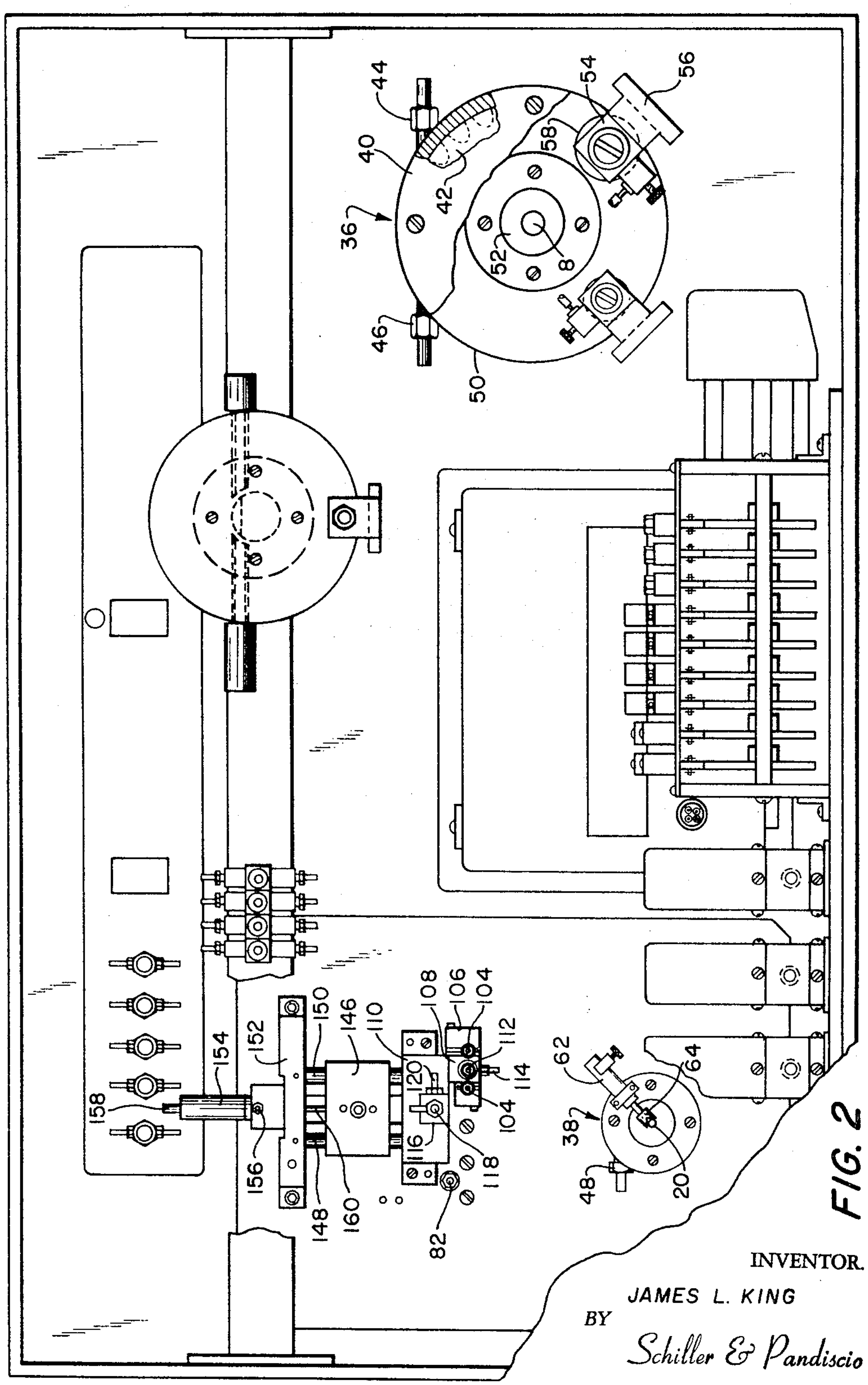
FIG. 2 is a rear view of the winding machine of FIG. 1, with certain elements omitted for convenience of illustration.

Turning now to FIGS. 1 and 2, the illustrated cassette tape splicing and winding machine comprises a console 2 having a front panel 4 which supports a splicing head assembly 6 and a splicing tape dispensing mechanism 8. The machine further includes a rotatable shaft 10 which projects through front panel 4 and supports a reel 12 on which is wound a supply of magnetic tape 14 that is to be used in filling cassettes. Also mounted on the front panel 4 is a cassette holder 16 that is adapted to hold a cassette 18 (see FIG. 9). The machine also includes a rotatable winding spindle 20 that projects out of front panel 4 and is adapted to mate with and drive one of the hubs of a cassette mounted in the holder 16.

Figure 10:
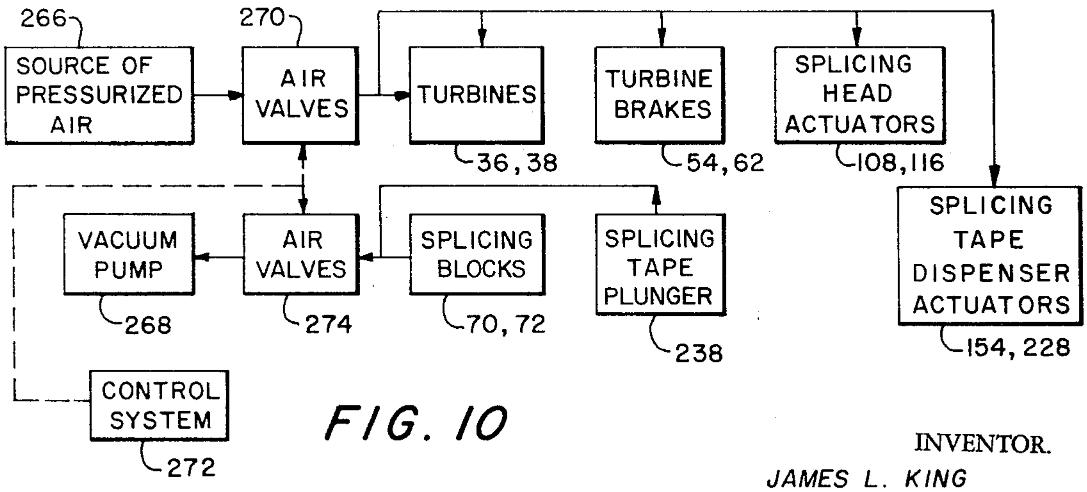
FIG. 10 is a block diagram showing means for operating the splicing tape dispensing mechanism in sequence with other components of the machine.

Tape 14 is payed out from reel 10 over a first guide roller 22 and around a large footage counting wheel 24 which is mounted on a shaft that is rotatably supported in the front panel of the machine. From wheel 24 the tape passes around two additional guide rollers 28 and 30 to the splicing head assembly 6. A fourth guide roller 32 is provided for guiding tape extending from the splicing head assembly to a cassette (not shown) mounted in the holder 16. The supply reel shaft 10 and the spindle 20 are connected to and driven by two air turbines 36 and 38 (see FIG. 2) which are affixed to the rear side of front panel 4. The turbine 36 comprises a hollow housing 40 in which is mounted a rotor 42 that is coupled to the shaft 8. Housing 40 has two air inlets 44 and 46 which are connected by hoses to appropriate air supplies and air valving mechanism. Air supplied via inlet 44 causes the rotor 42 to rotate counterclockwise (as seen in FIG. 2) so as to cause the reel 12 to pay off tape for delivery to the splicing head. Air supplied via the inlet 46 causes the rotor 42 to rotate in the opposite direction, this mode of rotation being utilized when it is desired to rotate the reel 12 in a direction to pull tape away from the splicing head assembly. The other turbine 38 is of similar construction but has only a single inlet 48 which is connected to an air supply and to an appropriate valving mechanism. Air admitted through inlet 48 causes the rotor of turbine 38 to rotate in a predetermined direction so as to cause the spindle 20 to draw tape from the reel 12 and wind it onto a hub of the cassette mounted in holder 16. The two turbines are each provided with braking means for stopping rotation of shaft 10 and spindle 20. Various forms of braking mechanisms may be used. In the illustrated machine, the turbine 36 is provided with a brake disc 50 attached to a hub 52 mounted on the rear end of shaft 10. Cooperating with the brake disc 50 is a brake mechanism consisting of a conventional fluid actuator 54 that is supported by a bracket 56 that is attached to the rear of the front wall of the machine. The fluid actuator has a brake pad 58 attached to the end of its operating piston rod. When the actuator is supplied with air so as to cause its piston rod to be extended, the brake pad 58 engages disc 50 and thus causes the rotor of turbine 36 to come to a stop. When the fluid actuator is supplied with air so as to retract its piston rod, the brake pad 58 is disengaged from the brake disc and the turbine rotor is free to rotate under the influence of air supplied to the housing of turbine 36. The other turbine 38 has a braking mechanism which consists of a fluid actuator 62 attached to the rear of front panel 4 of the machine. Actuator 62 has a block 64 attached to its piston rod, the block 64 having a V-shaped end slot which is sized so as to embrace the rear end of spindle 20 which projects out of the turbine. When fluid actuator 62 is supplied with air so as to extend its piston rod, the block 64 engages spindle 20 and causes it to come to a stop. Retraction of the piston rod frees the spindle for rotation under the influence of air supplied to the turbine via inlet 48. Except as shown in FIG. 10, further details of the system for operating the turbines and stopping them by operation of their braking mechanisms are omitted for brevity since such details are not essential to comprehension of the construction and function of the present invention.

The splicing head assembly 6 is essentially the same as the splicing head described and illustrated in my copending U.S. Patent application Ser. No. 147,376 for "APPARATUS FOR SPLICING TAPE", executed 5/25/71 and filed 5/27/71 (identified by attorney). Essentially the splicing head assembly 6 comprises a stationary splicing block 70 affixed to panel 4 and a moveable splicing block 72. The two blocks have mutual confronting flat vertical end surfaces identified by numeral 74 that are separated by a very narrow gap. The stationary block 70 has a horizontally extending upper surface in which is formed a single groove 76 (FIG. 3) which functions as a guideway for tape 14. The base of the groove is flat and its sides are slanted, and its base is provided with a series of small apertures 78 which communicate through an interior passageway (not shown) in block 70 to a hose fitting 82 (FIG. 2) that projects through the rear side of front panel 4 and is mounted in the rear side of block 70. A hose (not shown) is connected to the hose fitting 82 and extends to a source of vacuum through a suitable valve means. Thus if tape 14 (or a leader tape) is placed in groove 76 and vacuum is applied to splicing block 70 via the fitting 82, a suction force will be established which will hold the tape tight against the bottom of the groove.

The moveable splicing block is mounted on two parallel slide rods 84 and 86 (FIG. 3) which is slidably disposed in front panel 4. The block 72 has a horizontally extending upper surface that is formed with two parallel grooves 92 and 94 which are identical in shape and extend parallel to the groove 76 of fixed splicing block 70. These grooves have a series of apertures 96 formed in their base whereby suction may be applied to tapes positioned in the two grooves. The moveable block 72 is provided with two interior passageways (not shown) that communicate with the apertures 96 of grooves 92 and 94 respectively, and these passageways have ports that communicate with longitudinally extending bores (not shown) formed in the slide rods 84 and 86. Slide rods 84 and 86 have hose fittings 104 (FIG. 2) mounted in the rear ends thereof and which are connected through hoses (not shown) to a suitable source of vacuum through control valve means, whereby suction may be selectively applied to hold down tapes located in grooves 92 and 94.

Figure 3:
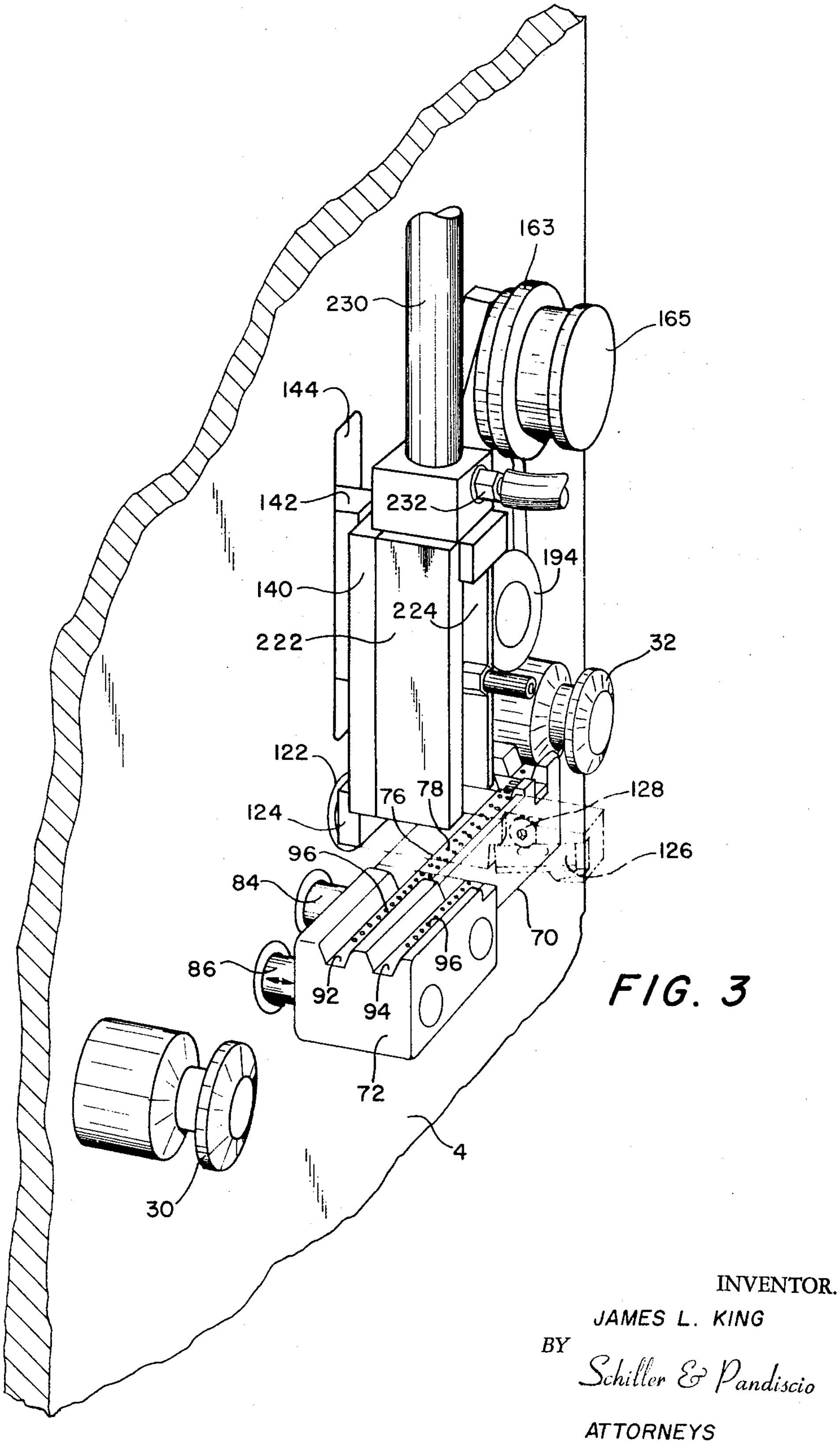
FIG. 3 is a perspective view of the splicing tape dispensing mechanism associated with the splicing head assembly machine.

Operating means are provided for moving block 72 in and out relative to panel 4 so as to selectively align either of the grooves 92 and 94 with groove 76. The means for moving the moveable splicing block 72 comprises a moveable crossblock 106 (FIG. 2) disposed behind the panel 4 and attached to the piston rod of a fluid actuator 108 which is secured to a large block 110 that is affixed to the panel 4. Actuator 108 is of the double-acting type, having inlets at the opposite ends of its cylinder which are provided with hose fittings 112 and 114 which are connected by means of hoses (not shown) and an appropriate control valve mechanism to a suitable source of pressurized air. When air is supplied to actuator 108 through its fitting 114, the actuator piston rod is retracted, moving the splicing block 72 up against the panel 4 so as to place its groove 94 into alignment with groove 76. When air is applied to actuator 108 through its fitting 112, its piston rod is extended so as to move the splicing block 72 outwardly (as shown in FIG. 3) so that its groove 92 is aligned with groove 76.

The machine also includes a knife mechanism which forms part of the splicing head assembly. The knife mechanism comprises an actuator 116 (FIG. 2) of the double-acting type which is affixed to block 110. The piston rod of actuator 116 extends through an oversized hole in the block 110 and attached to its free end is an elongate cutter blade support arm 124 (see FIGS. 3 and 9). The support arm 124 extends through a bushing 122 disposed in an aperture in the panel 4. The free end of support arm 124 is slotted on one side so as to accommodate a cutter blade 126 which is secured thereto by a screw 128. The cutter blade is mounted in line with the small gap between the two splicing heads 70 and 72, with its cutting edge facing down and inclined as shown in FIG. 3. When the piston rod of actuator 108 is fully retracted, arm 124 is withdrawn far enough so that the front end of the cutting blade 126 will not interfere with movement of tape along the groove 76. When the piston rod of actuator 116 is extended, the cutter blade 126 moves forward and its cutting edge slices through whatever tape is extending across from the groove 76 to one of the grooves 92 and 94. It is to be noted that the cylinder of actuator 116 is provided with hose fittings 118 and 120 at its opposite ends, whereby air admitted through hose fitting 118 will cause its piston rod to be extended and air admitted through hose fitting 120 will cause its piston rod to be retracted.

Figures 5, 6, 9:
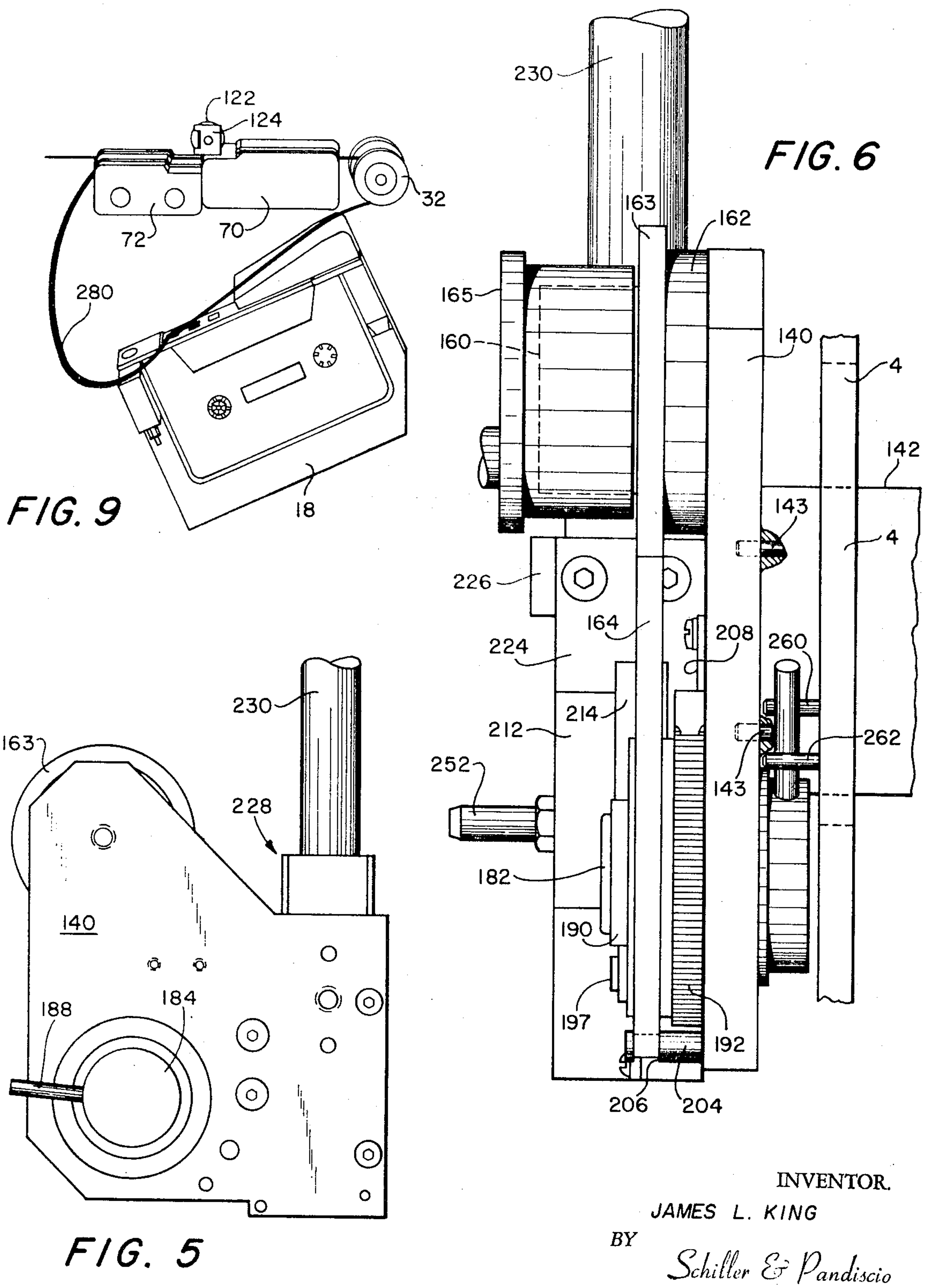
FIG. 5 is a rear view of the splicing tape dispensing mechanism.
FIG. 6 is a side view, partly in section, of the splicing tape dispensing mechanism.
FIG. 9 is a perspective view showing the leader of a tape cassette positioned on the splicing head assembly.

The splicing tape dispensing unit 8 is adapted to apply a piece of adhesive-backed splicing tape to the abutting ends of two tapes supported by two splicing blocks. Details of the splicing tape dispensing unit are shown in FIGS. 1 and 3–8. Essentially the unit 8 comprises a carriage plate 140 (see FIGS. 1 and 3–7) that is attached to an arm 142 that extends through a slot 144 in panel 4 and forms part of a slide block 146 that is slidably mounted on two slide rods 148 and 150 whose opposite ends are secured in block 110 mentioned previously and a second block 152 that is secured to the rear side of panel 4. Block 152 supports a double-acting fluid actuator 154 having hose fittings 156 and 158 at the opposite ends of its cylinder. Hoses (not shown) connect the hose fittings 156 and 158 to a suitable supply of pressurized air through suitable valving mechanism. The actuator 154 has a piston rod 160 that extends through an oversized hole in block 152 and is secured to the slide block 146. Thus by suitable application of air to actuator 154, slide block 146 can be made to reciprocate up and down on slide rods 148 and 150, causing the carriage plate 140 to reciprocate in the same manner. It is to be noted, as shown in FIG. 6, that the carriage plate 140 is provided with a pair of cavities on its rear side which are sized to snugly accommodate two pins 143 that are anchored in and project from arm 142. Thus the carriage plate 140 may be detached readily from the arm 142.

Affixed to carriage plate 140 is a hub 160 having an enlarged flange 162. Hub 160 serves to rotatably support a roll 163 of splicing tape 164 which is coated on one side with a pressure-sensitive adhesive. The roll 163 is held in place on hub 160 by means of a plastic cap 165 which is adapted to slip over and make a friction fit with the hub 160. The roll 163 is positioned by cap 165 and hub 162 in planar alignment with feed rolls hereinafter described.

Figure 4:
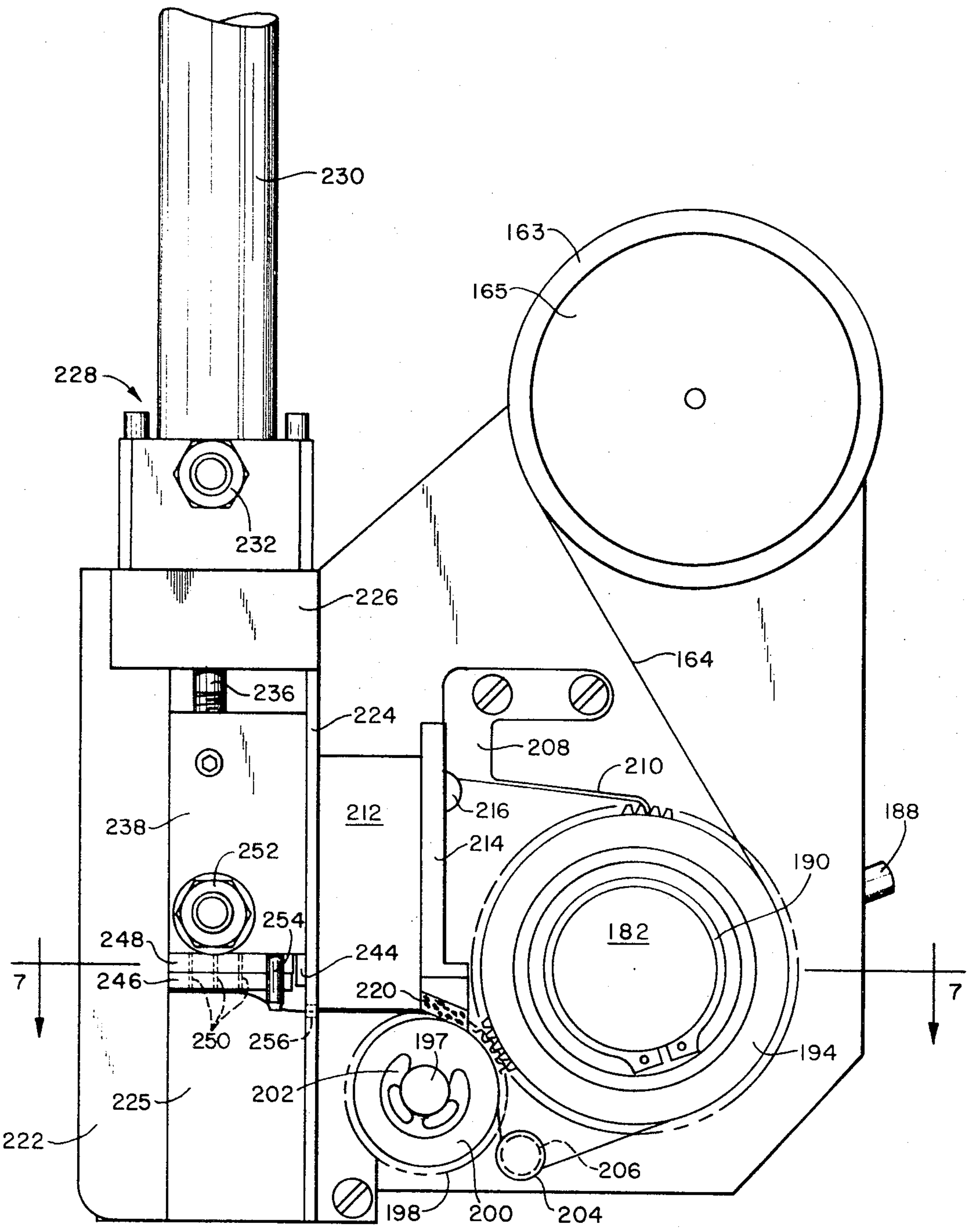
FIG. 4 is a front elevational view on an enlarged scale of the splicing tape dispensing mechanism.
Figure 8:
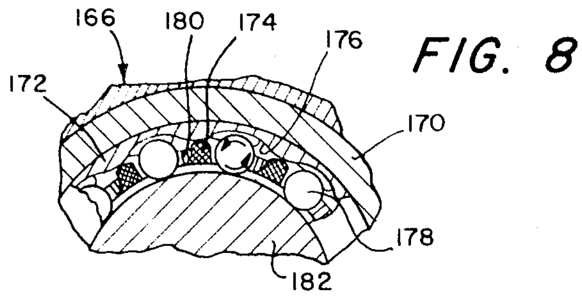
FIG. 8 is a partial sectional view of an overrunning clutch used in the splicing tape dispensing mechanism.
Figure 7:
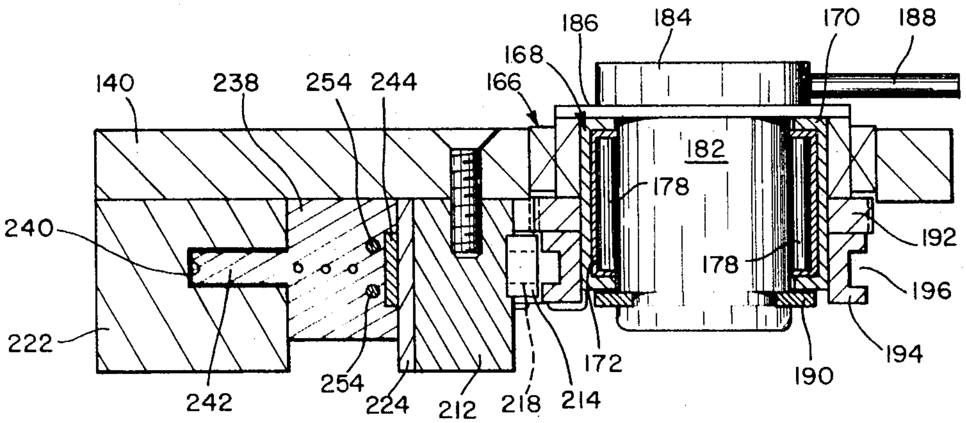
FIG. 7 is a sectional view taken along line 7—7 of FIG. 4.

Referring now to FIG. 7, plate 140 has a large hole in which is mounted a roller bearing unit 166. The outer race of the bearing unit 166 is locked to plate 140 by a force fit. The inner race of the bearing unit surrounds and is secured to a one-way clutch unit, identified generally by the numeral 168, which preferably is a type CD drawn cup precision overrrunning roller clutch manufactured by the Torrington Company of Torrington, Connecticut. As seen in FIGS. 7 and 8, the clutch unit comprises a cylindrical housing 170 which is secured to the inner race of bearing unit 166, a ring 172 mounted within and secured to housing 170, and a roller bearing race 174 mounted within ring 172. Ring 172 has a series of spaced, axially-extending, circumferentially inclined cam surfaces 176 and race 174 has a plurality of openings in which is disposed roller bearings 178 and spring members 180. Mounted within the clutch unit is a drive shaft 182. Affixed to the rear end of shaft 182 is a hub 184 having a flange 186. Hub 184 carries a radially extending arm 188. Shaft 182 is sized so as to engage rollers 178 and is restrained against axial movement by (*a*) engagement of flange 186 with the rear end of housing 170 and the inner race of bearing 166, and (*b*) engagement of a snap ring 190 with the front end of housing 170. Snap ring 190 is mounted in a peripheral groove formed in shaft 182. The rollers 178 always engage the shaft 182 but are urged by springs 180 circumferentially toward the end portions of the cam surfaces in ring 172 which are nearest the axis of shaft 182. Consequently if (as seen in FIG. 8) the shaft 182 is urged counterclockwise relative to the housing 170, the rollers 178 will be engaged by the cam surfaces 176 and the camming forces exerted by the latter will cause the housing 170 to rotate with shaft 182. On the other hand, if the shaft 182 is urged in a clockwise direction relative to housing 170, the cam surfaces will move out of engagement with the rollers and hence the shaft 182 can rotate without causing rotation of the housing 170. Clutch unit 168 is mounted on shaft 182 so that clockwise rotation of shaft 182 (as seen in FIG. 4) will cause housing 170 to rotate with it.

One-way clutches, and notably those having inclined cam surfaces and rollers that are spring-biased against the inclined surfaces, are well known in the art and are exemplified by U.S. Pat. Nos. 3482667, 3476226, 2832450, 2912086, 3194369, 3260333, 2569108, 3184020 and 2569108. These and other types of one-way clutches known to persons skilled in the art may be used for the same purpose as clutch unit 168.

Surrounding and secured to the clutch housing 170 is a large spur gear 192 and a tape feeding wheel or roll 194. The latter has a circumferential groove 196 that is just wide enough to receive the splicing tape 164. Roll 194 is mounted so that its groove 196 is located in planar alignment with the roll 163. Also affixed to carriage plate 140 is a short stub shaft 197 (FIG. 4). Rotatably mounted on stub shaft 197 are a second smaller spur gear 198 and a second smaller feed wheel or roll 200. The latter is connected to gear 198 so that they can rotate as a unit. A snap ring 202 secured in a groove on shaft 197 holds the feed wheel 200 on the shaft. Gear 198 meshes with gear 192 and the feed wheel 200 has a circumferential groove which has the same width as and is located in coplanar relation with groove 196 of feed roll 194. A tape guide pin 204 is also affixed to carriage plate 140 below feed roll 194. Pin 204 has a peripheral groove as shown at 206 in FIG. 4 which has the same width as and is in planar alignment with the grooves in rolls 194 and 200.

Also attached to the carriage plate 140 is a spring latch 208 having a finger 210 which presses against the teeth of gear 192 and prevents rotation of that gear under the influence of shock and vibration when no rotational force is being exerted on drive shaft 182. The finger 210 also prevents counterclockwise rotation of gear 192 and feed roll 194.

Mounted above stub shaft 197 on carriage plate 140 is a small block 212. Block 212 has a vertically extending groove on one side and mounted in the groove is an elongate arm 214 which is held in place by a screw 216. Arm 214 has a vertically extending slot 218 (FIG. 7) which the screw 216 extends. The slot 218 makes it possible to adjust the vertical position of arm 214 on block 212. The bottom end of arm 214 is provided with an inclined pad 220 which is sized so as to fit into the groove of feed roll 200. The pad 220 is preferably made of cork but also may be made of rubber or a low friction plastic such as Teflon. The pad 220 maintains the splicing tape 164 against the feed roll 200.

Also carried by plate 140 are two vertically extending members 222 and 224 that define a vertical channel 225. These members are spaced from each other and are connected at their top ends by a horizontally extending plate 226 which serves as a mounting plate for a double-acting fluid pressure actuator 228. The cylinder 230 of actuator 228 is provided with hose fittings 232 and 234 (see FIG. 1) for admitting air to the cylinder. The piston rod 236 of actuator 228 extends through an oversized hole in mounting block 226 down into the channel 225. Attached to the end of piston 236 is a plunger 238. The at-rest position of plunger 238 is as seen in FIG. 4. As seen in FIG. 7, the member 222 is provided with a vertically extending slot 240 sized to slidably and snugly receive a rib 242 formed integral with the plunger 238. Groove 240 cooperates with rib 242 to guide the plunger 240 as it is reciprocated by operation of actuator 228. Groove 240 also serves as a guide for the leading end of tape 164 as described more fully below. The plunger 238 has a longitudinally extending groove at the side opposite rib 242 and mounted in this groove is a cutter blade 244. Cutter blade 244 slidably engages the inner surface of the member 224. The cutter blade 244 and the member 224 are made of high quality tool steel. The bottom end of the plunger 238 is provided with a resilient pad 246 having a width (i.e. its dimension perpendicular to the plane of FIG. 4) which is slightly greater than the width of the splicing tape 164. The pad 246 is attached to a rib 248 formed on the bottom end of the plunger 238. The pad 246 and the rib 248 are provided with a plurality of aligned holes as indicated at 250 which communicate with an interior chamber in the plunger 238. The interior chamber of plunger 238 has an inlet port in which is mounted a hose fitting 252. Hose fitting 252 is connected by a hose (not shown) to a source of vacuum through appropriate valve means. By applying vacuum through hose fitting 252, it is possible to create a suction effect on the bottom surface of pad 246 which will hold tape 164 tight against the pad. The plunger 238 is also provided with a pair of vertically extending pins 254 (FIGS. 4 and 7) which project downward along the opposite sides of the rib 248 and the pad 246. The pins 254 serve to guide splicing tape as it is fed into the channel 225. The splicing tape is introduced into this channel through a horizontal slit 256 (FIG. 4) formed in the member 224. Thus as shown in FIG. 4, the path followed by the splicing tape is around the feed roll 194, under and around pin 204, up and around feed roll 200 and under the pad 220, and through horizontal slit 256 into the channel 225 below the plunger 238. It is to be noted that the slot 240 in the member 222, and the pad 246 and the rib 248 of plunger 238 are in planar alignment with feed rolls 194 and 200, so that as the splicing tape is advanced into the channel 225 beneath the plunger 238 it can proceed far enough to enter the groove 240.

Referring now to FIGS. 6 and 7, the panel 4 carries two vertically spaced pins 260 and 262 on its front side and disposed between them is the arm 188 carried by hub 184. Pins 260 and 262 act to cause arm 188, and thereby shaft 182, to rotate counterclockwise (as seen in FIG. 4) when carriage plate 140 is moved downward by operation of actuator 154 and clockwise when the plate is moved upward again. Due to the operation of clutch unit 168, feed rolls 194 and 200 rotate to feed tape 164 when the carriage plate 140 moves upward and remains stationary when the carriage plate moves downward. Pins 260 and 262 are spaced by an amount such as to cause arm 188 to rotate the two feed rolls just enough to advance the splicing tape through a distance equal to or slightly less than the distance between the inner face of member 224 and the opposite end face of slot 240.

The mode of operation of the splicing tape dispenser mechanism just described is set forth in the following description of the operation of the winding machine through one cassette-loading cycle.

Assume that the machine has just completed one cycle of operation and is ready to start another cycle, so that the splicing block 72 is retracted with its groove 94 aligned with groove 76 of splicing block 70 and vacuum is being applied to grooves 76, 92 and 94. A cassette 18 (FIG. 9) having a length of leader tape connected to and wound around its two hubs is mounted in the cassette holder 18, with one of its hubs in engagement with the drive spindle 20, and a supply reel 12 of magnetic tape 14 is mounted on the shaft 10. The tape 14 is threaded as shown in FIG. 1 around the several rolls 22, 24, 28 and 30 and its leading end is placed in the groove 92 of splicing block 72 so that it terminates just short of splicing block 70. Referring now to FIG. 9, the leader 280 of the cassette 18 is pulled out of the cassette to form a large loop which is reversed and disposed so that it extends from the left hand hub of the cassette upwardly around guide roller 32, along grooves 76 and 94 of the two splicing blocks, and then back to the right hand cassette hub. The leader 280 and the end of tape 14 are now held in place by suction. It is to be noted that at the beginning of the machine's operating cycle the splicing tape dispenser 8 is in the elevated position shown in FIG. 1 and the cutter arm 124 is retracted as shown in full lines in FIG. 3. The machine is now actuated to start its operating cycle. First the actuator 116 is operated so as to cause the cutter blade 126 to be reciprocated, the cutting blade cutting the leader tape into two discrete leaders as it moves forward. As soon as the cutter blade 126 has returned to its original retracted position, the actuator 108 is operated to move the splicing block 72 forward and thereby place its groove 92 into alignment with the groove 76 as shown in FIG. 3. At this point the end of the magnetic tape held in groove 92 is aligned with the end of the leader held in groove 76. Next the actuator 154 is operated to drive the carriage plate 140 of the dispensing mechanism downwardly far enough for the member 222 and 224 to engage or nearly engage the splicing blocks 70 and 72. Then with the carriage plate in this down position, the actuator 228 is operated so as to cause its plunger 238 to move downward in channel 225. Simultaneously vacuum is applied to plunger 238 via hose fitting 252. Assuming that the leading end of the splicing tape 164 has previously been fed through the slit 256 and extends across 225 beneath pad 246 and into guide slot 240, the vacuum applied via fitting 252 creates a suction effect that holds the end of the splicing tape up against the pad 246. As the plunger moves downwardly its cutter member 244 severs the splicing tape by a shearing action at the point where the tape comes through the slit 256. The severed portion of splicing tape, held against pad 246 by suction, is driven downwardly by the plunger 238 into engagement with the tapes in grooves 76 and 92, whereby the pressure-sensitive adhesive coating on the splicing tape causes the splicing tape to be attached to the two tapes. Immediately thereafter actuator 228 is caused to raise plunger 238 back to its original position. However, as the plunger 238 reaches the bottom end of its downward stroke and before it starts to move upward again, the vacuum being applied through hose fitting 252 is terminated, thereby releasing the splicing tape from the plunger and allowing the splicing tape to remain in contact with the spliced tapes on the splicing block as the plunger 238 moves upwardly again to its original position. As the plunger 238 moves upwardly again, or after it has returned to its original elevated position, the actuator 154 is operated so as to cause the carriage plate 140 to move upwardly again to its original raised position. As the carriage plate moves upwardly, the arm 188, which is restrained by pin 260, rotates and thereby causes the shaft 182 to rotate. This rotation of shaft 182 causes the gears 192 and 200 to rotate clockwise and counterclockwise respectively (as seen in FIG. 4) so as to advance an additional length of splicing tape into the space between the members 222 and 224 in anticipation of the next cycle of operation of the splicing tape dispenser as above described. It is to be noted that vacuum may be applied through the fitting 252 immediately after the carriage plate has returned to its original elevated position (instead of at the time when actuator 228 is operated to move plunger 238 downward) so as to cause the portion of the splicing tape 164 in the channel 225 to be held to the pad 246 by suction.

As soon as carriage plate 140 has begun to return to its original elevated position, or after it has reached that position, the vacuum being supplied to grooves 76 and 92 is terminated and turbines 36 and 38 are operated so as to cause magnetic tape to be unwound from the supply spool 12 and drawn over the splicing block assembly into the cassette 18. The amount of tape being fed to the cassette is monitored by the footage wheel 24 which is rotated by the moving tape 14. Means (not shown) mounted behind the rear panel 4 are provided for counting the number of revolutions of the footage counting wheel 24 and generating pulses at a rate proportional to the rate of rotation of the footage counting wheel 24. These pulses are fed to an electronic counter 164 mounted in the front panel of the machine. When the number of its input pulses has reached a predetermined total, the counter produces an output signal which through other control means (not shown) causes the two turbines to be halted by operation of their brake mechanisms. As soon as the turbine 36 and 38 have stopped rotating, vacuum is reapplied to grooves 76 and 92 so as to hold tape 14 in place and the actuator 108 is again operated so as to cause the cutter 126 to sever the magnetic tape 14 extending across from the groove 76 to the groove 92. As soon as the cutter blade 126 has returned to its retracted position, the splicing head 72 is retracted through operation of actuator 108 so as to place the leader held in groove 94 into aligned relation with the end of the tape held in groove 76. Then the splicing tape dispenser 8 is again operatedin the manner above described so as to apply a section of adhesive-backed splicing tape to the abutting ends of the magnetic tape in groove 76 and the leader tape in groove 94. Then the cassette 18 is removed from the holder 16 and one of the hubs of the cassette is rotated so as to fully draw the tape into the cassette. Thereafter a new cassette is placed in holder 16 and filled with magnetic tape according to the procedure described above.

FIG. 10 illustrates in block diagram from the means required to operate the splicing tape dispensing mechanism in conjunction with the other operating sections of the machine herein described. Essentially it is necessary to provide a source of pressurized air 266 (which may be an air compressor that supplies air pressure through a pressure regulator) and a vacuum pump 268 which serves as a source of vacuum. The high pressure air is applied selectively to the turbines 36, 38, the turbine brakes 54, 62, the splicing head actuators 108, 116 and the actuators 154, 228 of the splicing tape dispenser mechanisms through a plurality of air valves 270 which are operated by a suitable control system 272. Suction generated by vacuum pump 268 is selectively applied to the grooves 76, 92 and 94 of the splicing head assembly and the plunger 238 of the splicing tape dispenser mechanism through a second group of air valves 274 which also are operated by control system 272. The control system, which may take any convenient form, is adapted to operate individual ones of the air valves 270 and 274 at times and in such order as to cause the machine to operate according to the mode of operation described above. By way of example, the control system may be designed so as to effect operation of some or all of the air valves mechanically by means of motor driven cams or electrically by means of solenoids, or by any other suitable means.

What is claimed is:

1. A splicing tape dispensing mechanism comprising a support, a carriage plate, means attached to said support mounting said carriage plate for reciprocal movement relative to said support along a straight line path, means for reciprocating said carriage plate along said path, means carried by said carriage plate for feeding an elongate splicing tape, tape feed operating means for operating said tape feed means only when said carriage plate is moved in a first direction along said path so that a predetermined amount of tape is advanced by said tape feeding means, guide means carried by said carriage plate for positioning the leading end of said tape as it is advanced by said tape feeding means, and cutting means carried by said carriage plate for severing a length of said tape including the leading end thereof at a selected point relative to said guide means, said tape feed operating means comprising a one-way rotary clutch carried by said carriage plate and coupled to said means for feeding splicing tape, and means coupling said clutch and said support for causing said clutch to rotate first in one direction and then in an opposite direction responsively to reciprocal movement of said carriage plate along said path.

2. A mechanism according to claim 1 further including means carried by and moveable relative to said carriage plate for dispensing the said length of tape severed by said cutting means.

3. A mechanism according to claim 2 wherein said dispensing means and said cutting means are moveable as a single unit.

4. A mechanism according to claim 3 further including means carried by said carriage plate defining a guide channel, said cutting means and said dispensing means being disposed within and moveable longitudinally of said guide channel.

5. A mechanism according to claim 2 wherein said channel has a side opening whereby tape advanced by said tape feeding means enters said channel in position to be severed by said cutting means, said channel being open at one end to permit tape severed by said cutting means to be dispensed by said dispensing means.

6. A mechanism according to claim 1 wherein said tape feed means comprises a tape feed roll and said tape feed operating means includes means operatively connecting said one-way clutch to said tape feed roll.

7. A mechanism according to claim 2 wherein said dispensing means is a ram, and further including means for releasably holding said severed length of tape against said ram by suction.

8. A mechanism according to claim 2 wherein said dispensing means is a ram and said cutting means comprises a cutter blade attached to said ram, and further including means for reciprocating said ram and cutter blade.

9. A mechanism according to claim 2 wherein said dispensing means is a ram, and further including a guide channel, said cutting means and said ram being disposed within and moveable longitudinally of said channel.

10. A mechanism according to claim 12 wherein said channel has a side opening whereby tape advanced by said tape feed means enters said channel in position to be severed by said cutting means, said channel being open at one end to permit tape severed by said cutting means to be dispensed by said ram.

11. A mechanism according to claim 1 wherein said tape feeding means comprises first and second tape feed spools, and said tape feed operating means comprises gear means connecting said tape feed spools so that said second spool will rotate in synchronism with said first spool and means connecting said first spool to said one-way clutch so that said first spool is rotatably driven by said clutch only when said carriage plate moves in a first direction along said path.

12. A mechanism according to claim 1, further including means for dispensing said length of tape, said dispensing means comprising means for selectively applying vacuum so as to hold said severed length of tape by means of suction.

13. A splicing tape applicator according to claim 11 wherein said means for rotating said shaft comprises an arm having one end affixed to said shaft and means attached to said support for applying a force to said arm so as to rotate said shaft as said carriage is reciprocated.

14. A splicing tape applicator comprising a carriage, a support, means attached to said support mounting said carriage for reciprocal movement relative to said support along a straight-line path, a shaft, a clutch rotatably supported by said carriage and coupled to said shaft, said clutch being adapted to permit relative rotation of said shaft when said shaft is subjected to a turning force in one direction and to lock to said shaft when said shaft is subjected to a turning force in the opposite direction, means for feeding splicing tape including a tape feed spool and means coupling said tape feed spool to said clutch so that said tape feed spool and clutch will rotate as a unit, tape guide means carried by said carriage for guiding the leading end of tape advanced by said tape feed spool, tape cutting and applying means associated with said guide means comprising a knife for cutting a length of tape off the leading end of said tape at a point within said guide means and pressure member for dispensing said length of tape and applying it under pressure to materials to be spliced, means for reciprocating said carriage along said path, means for rotating said shaft first in said one direction and then in said other direction as said carriage is reciprocated, and means for actuating said tape cutting and applying means.

15. A splicing tape applicator according to claim 14 wherein said pressure member includes a pressure pad, and further including means for selectively applying vacuum so as to hold said severed length of tape against said pad by means of suction.

16. In a machine for splicing magnetic tape to a leader and winding said leader and magnetic tape on a spool, said machine including a splicing head with a horizontally extending surface for supporting magnetic and leader tapes to be spliced, a splicing tape applicator for applying a length of splicing tape to the said tapes to be spliced, said applicator comprising a carriage disposed above said splicing head, means supporting said carriage for reciprocal straight line movement toward and away from said splicing head, means carried by said carriage for feeding splicing tape, means for operating said splicing tape feeding means only when said carriage is moving away from said splicing head, guide means carried by said carriage for positioning the leading end of said splicing tape as it is being advanced by said feeding means so that it is aligned longitudinally with said splicing head surface, selectively operable means for (a) severing a length of splicing tape off of said leading end thereof, (b) propelling said severed length of tape downwardly toward said splicing head and (c) pressing said severed length of tape down onto the ends of magnetic and leader tapes supported by said splicing head surface, and means for operating said selectively operable means as said carriage stops moving down toward said splicing block and before said carriage commences moving up away from said splicing block.

17. The combination of claim 16 wherein said selectively operable means comprises a reciprocal plunger for propelling and pressing said severed length of tape and means for holding said severed length of tape against said plunger by suction.

* * * * *

UNITED STATES PATENT OFFICE
CERTIFICATE OF CORRECTION

Patent No. 3,753,835 Dated August 21, 1973

Inventor(s) James L. King

It is certified that error appears in the above-identified patent and that said Letters Patent are hereby corrected as shown below:

In Claim 10, Column 11, Line 15, change --12-- to "9".

In Claim 13, Column 11, Line 35, change --11-- to "14".

Signed and sealed this 18th day of December 1973.

(SEAL)
Attest:

EDWARD M.FLETCHER,JR.
Attesting Officer

RENE D. TEGTMEYER
Acting Commissioner of Patents